United States Patent
Zaneboni et al.

(10) Patent No.: US 9,302,780 B2
(45) Date of Patent: Apr. 5, 2016

(54) AIRCRAFT WITH A COCKPIT INCLUDING A VIEWING SURFACE FOR PILOTING WHICH IS AT LEAST PARTIALLY VIRTUAL

(71) Applicant: AIRBUS SAS, Blagnac (FR)

(72) Inventors: Jason Zaneboni, Blagnac (FR); Bruno Saint-Jalmes, Toulouse (FR)

(73) Assignee: Airbus SAS, Blagnac (FR)

( * ) Notice: Subject to any disclaimer, the term of this patent is extended or adjusted under 35 U.S.C. 154(b) by 0 days.

(21) Appl. No.: 14/138,574

(22) Filed: Dec. 23, 2013

(65) Prior Publication Data

US 2014/0180508 A1    Jun. 26, 2014

(30) Foreign Application Priority Data

Dec. 21, 2012 (FR) ...................... 12 62661

(51) Int. Cl.
*G06F 7/70* (2006.01)
*B64D 45/00* (2006.01)
*B64D 43/00* (2006.01)
*B64D 11/00* (2006.01)

(52) U.S. Cl.
CPC ............... *B64D 45/00* (2013.01); *B64D 43/00* (2013.01); *B64D 2011/0061* (2013.01)

(58) Field of Classification Search
CPC ..................................................... B64D 11/00
USPC .......................................................... 701/14
See application file for complete search history.

(56) References Cited

U.S. PATENT DOCUMENTS

| 5,240,207 A | 8/1993 | Eiband et al. |
| 5,875,997 A | 3/1999 | Al-Sabah |
| 6,944,032 B1 * | 9/2005 | Steffensmeier et al. ...... 361/803 |
| 2004/0169663 A1 | 9/2004 | Bernier |
| 2005/0007386 A1 * | 1/2005 | Berson et al. ................. 345/633 |
| 2007/0103776 A1 * | 5/2007 | Cok et al. ...................... 359/451 |
| 2008/0179457 A1 | 7/2008 | Guering |

FOREIGN PATENT DOCUMENTS

| EP | 0 980 828 | 2/2000 |
| EP | 1 453 009 | 9/2004 |
| FR | 2 903 661 | 1/2008 |

OTHER PUBLICATIONS

Search Report for FR 1262661, dated Jul. 31, 2013.

* cited by examiner

*Primary Examiner* — James Trammell
*Assistant Examiner* — Michael D. Lang
(74) *Attorney, Agent, or Firm* — Nixon & Vanderhye P.C.

(57) ABSTRACT

The invention concerns an aircraft including a cockpit comprising a viewing surface for piloting giving at least one pilot a view of an outside scene comprising the environment of the aircraft extending forward of the aircraft. At least part of said viewing surface for piloting is free of any glazed surface and is formed by display means for a digital image representing at least part of an outside scene comprising the environment of the aircraft extending forward of the aircraft.

14 Claims, 4 Drawing Sheets

AIRCRAFT WITH A COCKPIT INCLUDING A VIEWING SURFACE FOR PILOTING WHICH IS AT LEAST PARTIALLY VIRTUAL

This application claims priority to FR Application No. 1262661 filed Dec. 21, 2012, the entire contents of which is hereby incorporated by reference.

BACKGROUND OF THE INVENTION

The invention concerns a cockpit for a civil transport aircraft, that is to say for a commercial aircraft transporting passengers, their baggage and/or goods. The cockpit is the space reserved for the pilots. It contains all the controls (controls for actuating control surfaces, lift-increasing flaps and the like, controls for actuating the landing gear, the engines, the air-brakes, etc.) and the instruments necessary for piloting the aircraft. Conventionally it is always located at the front of the fuselage, in a region of the aircraft called the nose, provided with wide front and lateral window panes giving the pilots an unobstructed view not only forward of the aircraft, but also downward for the phases of landing and locomotion on the ground. In all that follows, "nose" is used to mean the whole of the front part of the fuselage, of modifiable form configured to receive the crew, which extends forward generally from a rear partition of the cockpit or of a resting area for the crew in a conventional aircraft, and which comprises a radome and a housing for a front landing gear.

SUMMARY OF THE INVENTION

For aerodynamic reasons, the nose should ideally be lancet-shaped. However, the housing in the nose for radar, a landing gear, and especially for the cockpit, requires a much more complex shape and structure to be provided, with numerous radii of curvature. In particular, the presence of the cockpit requires a large glazed surface to be provided in order to give operational physical visibility and to meet the rules and requirements for certification, such a glazed surface being very heavy which requires numerous structural reinforcements to be put in place which increase the mass of the aircraft still further.

In order to optimize the view outside and in particular to limit the problems of optical distortion and the impact on the aerodynamics of the aircraft, the front panes are preferably flat or have a dual curvature with large radii, and this adds still further to the weight for the glazed part.

What is more the positioning of the cockpit at the front of the aircraft extending in line with the passenger cabin reduces the size of that cabin all the more and the number of passengers capable of being received or their comfort, thereby limiting the financial profits for the airline company exploiting the aircraft.

The invention is directed to mitigating these drawbacks by providing an aircraft having a new cockpit of which the impact on the mass and on the aerodynamics of the aircraft is significantly reduced.

Another object of the invention is to enable the payload the aircraft can take aboard to be increased.

The invention is also directed to increasing safety, in particular by improving the pilot's perception and awareness of the outside scene forward of the aircraft.

For this, the invention concerns an aircraft including a cockpit comprising a surface, referred to as viewing surface for piloting, giving at least one pilot a view of an outside scene comprising the environment of the aircraft extending forward of the aircraft. The aircraft according to the invention is remarkable in that at least part of said viewing surface for piloting is free of any glazed surface and is formed by display means for a digital image representing at least part of an outside scene comprising the environment of the aircraft extending forward of the aircraft.

Thus, at least part of the windshield assembly through which, in the cockpit of the prior art, the pilot may see the outside scene forward of the aircraft, is virtual in the cockpit according to the invention. This windshield assembly part is replaced by a digital image, that is to say that at least part of the outside scene as viewed by the pilot is a virtual reconstitution of the real environment of the aircraft. The replacement of at least part of the glazed surface by display means for a digital image gives the possibility of improving the aerodynamics and of lightening the structure, and thus the weight, of the aircraft nose.

It is to be noted that the outside scene which the pilots may observe in a traditional aircraft is limited to the environment extending forward of the aircraft from the nose. As will be seen on reading the following description, the invention enables the pilot to be offered the choice between several outside scenes, while it is to be noted that, for the needs of piloting, the outside scenes offered include the environment forward of the aircraft.

Advantageously and according to the invention, the display means comprise one or more of the following means:
a screen and associated means for projection (including back-projection)
a device with lasers for forming a holographic image.

The digital image of the outside scene may be an image projected onto a screen or take on the form of a hologram or any other form.

This digital image of the outside scene may be formed from video data supplied by an on-board video camera, disposed for example at the front of the aircraft or in a fin of the aircraft, and/or on the basis of data stored in data banks or supplied by other video cameras. For example, when the aircraft is in locomotion on the ground and approaches a parking place in an airport, the projected image may be formed by a 3D reconstitution of the airport, stored in a data bank stored in a computer server on the ground, or captured by a video camera, in which reconstitution are embedded images termed circumstantial images, representing any obstacles currently present in the outside scene (such as an aircraft present at another parking place for example or any other vehicle passing within the zone), these incidental images coming from data supplied by an airport management service or by a video camera of the airport.

Where the screen only covers part of the viewing surface for piloting, the rest of the viewing surface for piloting is formed by in the usual manner by glazed surfaces. As the total surface area of the glazed surfaces of the aircraft is reduced, the aircraft is made lighter.

Furthermore, the glazed surfaces of the cockpit according to the invention may be of smaller size than those provided in the aircraft of the prior art. The structural reinforcements required for their integration into the structure of the aircraft are thus less or are even totally unnecessary, which also contributes to reducing the mass of the aircraft. Preferably, each of the glazed surfaces which the viewing surface for piloting may possibly comprise has a sufficiently small surface area to be able to be integrated between two frames of the aircraft or, in the case of an aircraft with a composite structure, to be able to be integrated with a minimum of reinforcements (the maximum allowable surface area for each glazed surface depends on the form of the fuselage, and in particular on the diameter of the aircraft). The reduction of the glazed surfaces of the aircraft furthermore makes it possible to adopt a perfect lancet shape for the nose, which considerably simplifies the manufacture of the aircraft and results in an appreciable improvement in its aerodynamic performance.

The mass saving obtained and the adoption of an aerodynamic shape directly induces a reduction in the fuel consumption of the aircraft and an improvement in the operating income of the aircraft for the airline company. The replacement of at least part of the windshield assembly of the prior art by a screen or other display means for a digital image also makes it possible to envision cleaning said digital image and/or enriching it using technologies such as 3D representation or augmented reality, capable of improving the perception by the pilot of the outside scene, and thereby of increasing safety. For example, if an obstacle is detected on the path of the aircraft (in flight, this may be a storm cloud, on the ground, a vehicle situated on the runway or a parking place in an airport), it is possible to modify a video image of the outside scene so as to draw the pilot's attention to that obstacle: by putting the obstacle into relief (3D representation); by accentuating the outline of the obstacle (augmented reality); by embedding within the image the representation of the aircraft according to the invention next to the obstacle (while taking account of the current course of the aircraft), or still another possibility is by embedding within the image the plot of the path that the aircraft should take to avoid the obstacle with certainty.

Advantageously and according to the invention, the cockpit lacks any glazed surfaces, and the entirety of the viewing surface for piloting is formed by the display means.

This preferred version does not exclude the possibility of providing a viewing surface for piloting, comprising a screen and projection means or other display means for a digital image (indirect viewing), which preferably cover the major part of the viewing surface for piloting, and further comprising one or more small glazed surfaces (direct viewing) of reduced surface area, that are planar or have a long radius of curvature, which complete the screen (so as to cover the entirety of the viewing surface for piloting) or which are superposed relative to the screen, it then being provided for the latter to be transparent (OLED screen for example).

Preferably, the screen (which covers the entirety or only part of the viewing surface for piloting) is an Organic Light-Emitting Diode (OLED) screen. This technology makes it possible to design screens of various shapes, in particular curved screens.

Advantageously and according to the invention, the general shape of the viewing surface for piloting is that of a spherical cap, and the cockpit comprises a seat for a pilot situated in the center of that spherical cap. It may also be ovoid or lancet-shaped.

In a preferred version, the viewing surface for piloting is of substantially hemispherical shape, for example having a radius comprised between 3 and 4 meters. The viewing surface for piloting thus gives the pilot a 180° panoramic view—both vertically and horizontally—of the outside scene. Of course, a screen giving the pilot a panoramic view of less than 180° or of more than 180° is also in accordance with the invention.

Such a configuration is made possible by the use according to the invention of a screen, or of a combination of a screen and glazed surfaces, instead of and in place of known windshield assemblies.

The object of this preferred version is to immerse the pilot in a three-dimensional universe, at the center of the action. This sensation of total immersion participates in strong and proper awareness of the environment by the pilot and thereby increases efficacy and safety.

Furthermore, the replacement of part of or the whole of the windshield assembly of prior cockpits by display means for a digital image makes it possible easily to envision delocalization of the cockpit to an unused zone of the aircraft, and in particular into a zone difficult to configure for receiving passengers or freight. The invention thus makes it possible to increase the payload of the aircraft and to improve its operating income for the aircraft company.

Thus for example, the cockpit according to the invention is advantageously situated in a lower part of a fin (vertical tail) of the aircraft. In this case, it is possible to maintain part of the viewing surface for piloting as glazed surface, through which the pilot is able to see the outside scene forward and to the sides of the aircraft, as well as the part of the aircraft which extends forward of the fin, including the wing. However, that position of the cockpit does not enable the pilot to see, through a glazed surface, the environment of the aircraft extending below the nose thereof (which environment may form part of the outside scene which the pilot may wish to have available in particular for the phases of locomotion on the ground. That part of the viewing surface for piloting is then formed by a screen for example.

As a variant, the piloting station according to the invention may also advantageously be situated below a cabin adapted to receive passengers, that is to say in a hold.

When the cockpit is so delocalized in the fin or in a hold, it is advantageous to provide for the passenger cabin to extend right to the front end of the aircraft, in order to increase the number or the comfort of the passengers that may be received and to give them an unprecedented view of the environment forward of the aircraft (windows provided for that purpose preferably being of much smaller size than the windshield assembly of known aircraft, in the interests of saving mass).

The invention also concerns an aircraft characterized in combination by all or some of the features described above and below.

SUMMARY OF THE DRAWINGS

Other details and advantages of the present invention will appear from the reading of the following description, which refers to the diagrammatic appended drawings and which relates to preferred embodiments, provided by way of non-limiting examples. In the drawings:

FIG. 1 illustrates that cockpit during a phase of locomotion on the ground; FIG. 2 illustrates the cockpit during a phase of flight above a mountain chain; FIGS. 3 and 4 illustrate the cockpit or a part thereof during a phase of flight in bad weather.

DETAILED DESCRIPTION OF THE INVENTION

Figure 1:
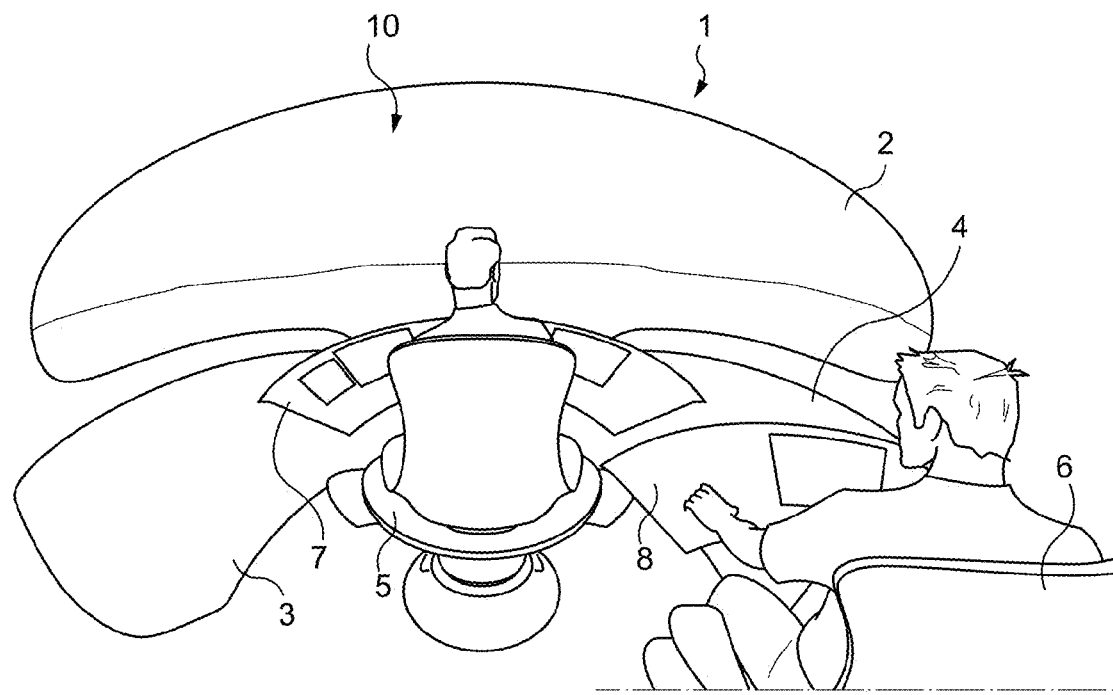
FIGS. 1 to 4 are diagrammatic perspective views of a cockpit according to the invention observed in different phases of a mission and according to different scenarios.
Figure 2:
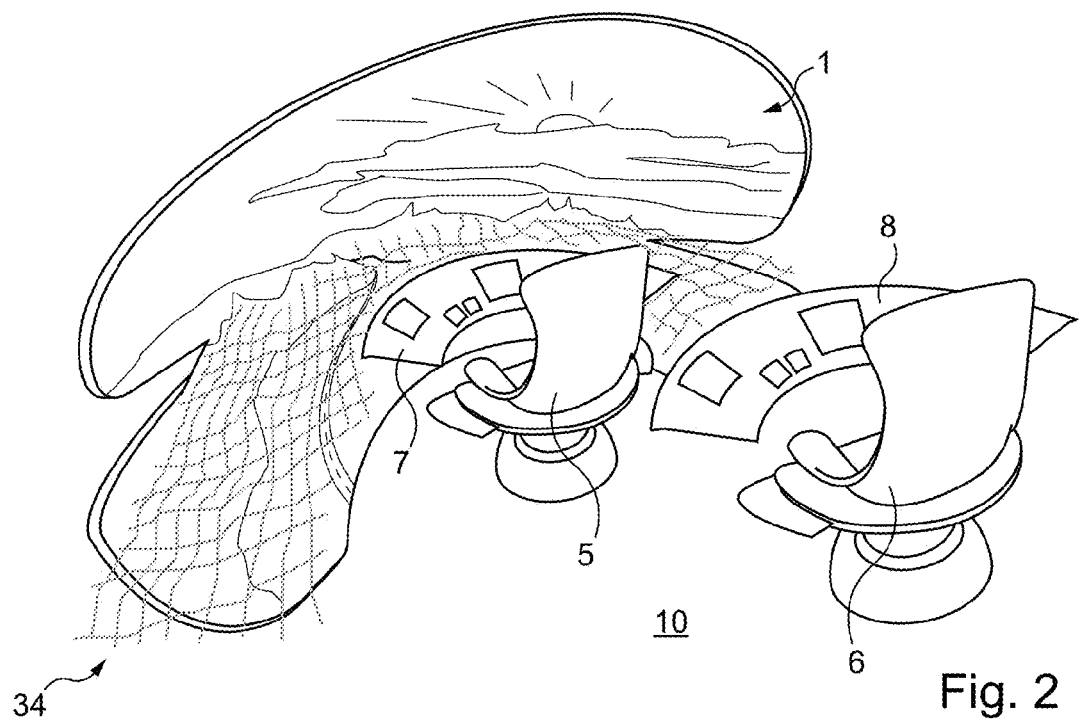
Figure 3:
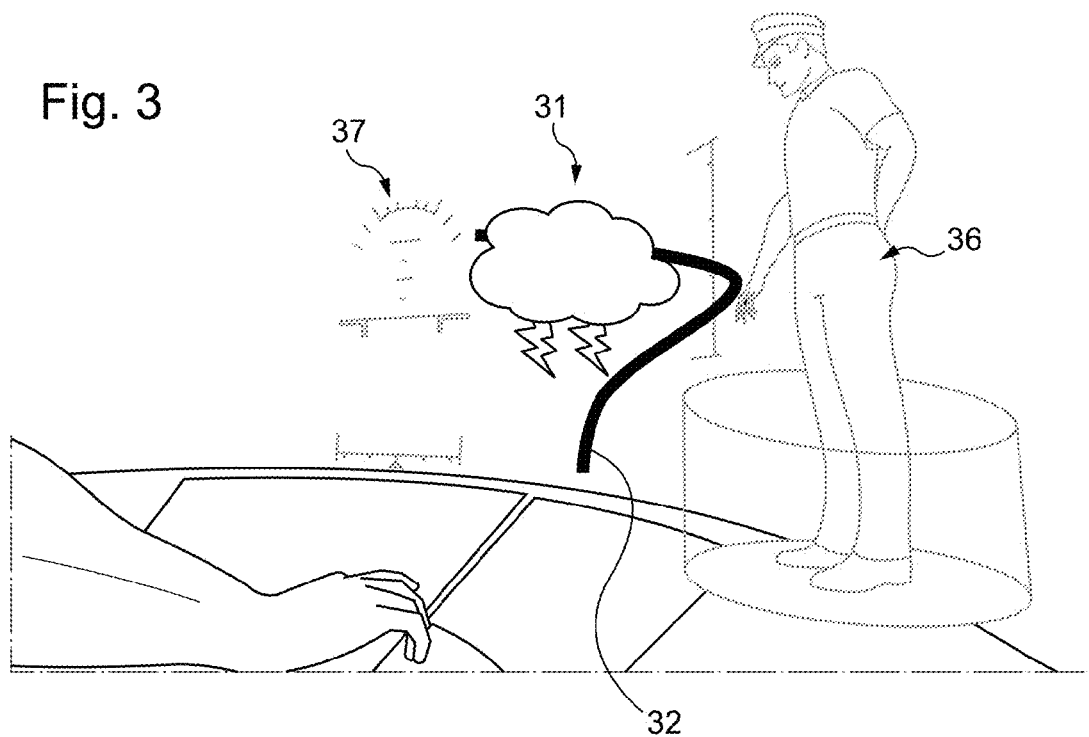

The cockpit 10 illustrated in FIGS. 1 to 3 has a viewing surface 1 for piloting which is entirely formed by a spherical screen, for example by an OLED screen. In the illustrated example, that screen comprises three zones: a panoramic first zone 2 for viewing an upper part of an outside scene taking place forward of the aircraft, and two lower zones 3, 4 for viewing a lower part of that outside scene for example. These zones may be separate or form a continuous surface. The cockpit further comprises a first seat 5 for a first pilot arranged substantially at the center of the spherical cap formed by the screen, and a second seat 6 for a second pilot arranged to the rear and offset to one side of the first seat 5. The expressions "to the rear", "forward", "to the side" make reference to a direction defined by a central axis of the cockpit passing through a central point of the viewing surface for piloting 1 and through a central point of a sitting surface of the first pilot seat 5 and passing from the seat 5 to the viewing surface for piloting 1. Preferably, this central axis of the cockpit coincides with a central longitudinal axis of the aircraft, in order for the pilot to be installed in the "direction of travel" and to experience the same sensations as in a conventional cockpit. It is to be noted that the illustrated cockpit is configured to receive two pilots but that it is also possible to provide only one pilot (the cockpit then only comprises a single pilot seat).

Each seat 5, 6 is mounted on a rack slide (not shown in the drawings) preferably extending, and thus enabling displacement of the seat, along the central axis of the cockpit. Forward of the rack slide of the first seat 5 are situated two rudder pedals (not visible in the drawings). The rack slide thus makes it possible to adjust the distance between the pilot seat 5 and the rudder pedals, according to the size of the pilot.

The cockpit also comprises a first instrument panel 7 which, in position of use, follows an arc of a circle substantially centered on a central point of the rack slide of the first seat 5, and a second instrument panel 8 which, in position of use, follows an arc of a circle substantially centered on a central point of the rack slide of the second seat 6.

The instrument panels 7, 8 each comprise a touch screen of transparent OLED type. Thus, the screen 2 to 4 of the viewing surface for piloting 1 is visible through the two instrument panels.

The digital image of the outside scene projected onto the screen 2 to 4 is for example formed from a video image of the outside environment captured by an on-board video camera (not shown), which may be housed in the nose of the aircraft or in a fin of the aircraft. It may as a variant or in combination be reconstituted from images stored in data banks (on-board or on the ground).

The outside scene so filmed from the aircraft or reconstituted may be:
an outside scene as is seen in a conventional aircraft, that is to say the environment of the aircraft forward of its nose;
the environment of the aircraft and the aircraft seen from its fin (looking towards the front of the aircraft)
the environment of the aircraft and the aircraft seen from a point situated to the rear of the aircraft and at a higher or lower altitude (this point of view being fixed relative to the aircraft, but preferably capable of being chosen by the pilot).

In a preferred version of the invention, the images of several outside scenes are produced and made available to the pilot, and the display means comprise means for selecting the display enabling the pilot to select the scene or scenes he wishes to display, depending, for example, on his manner of piloting or on the situation (phase of flight, weather conditions, etc.).

Figure 4:
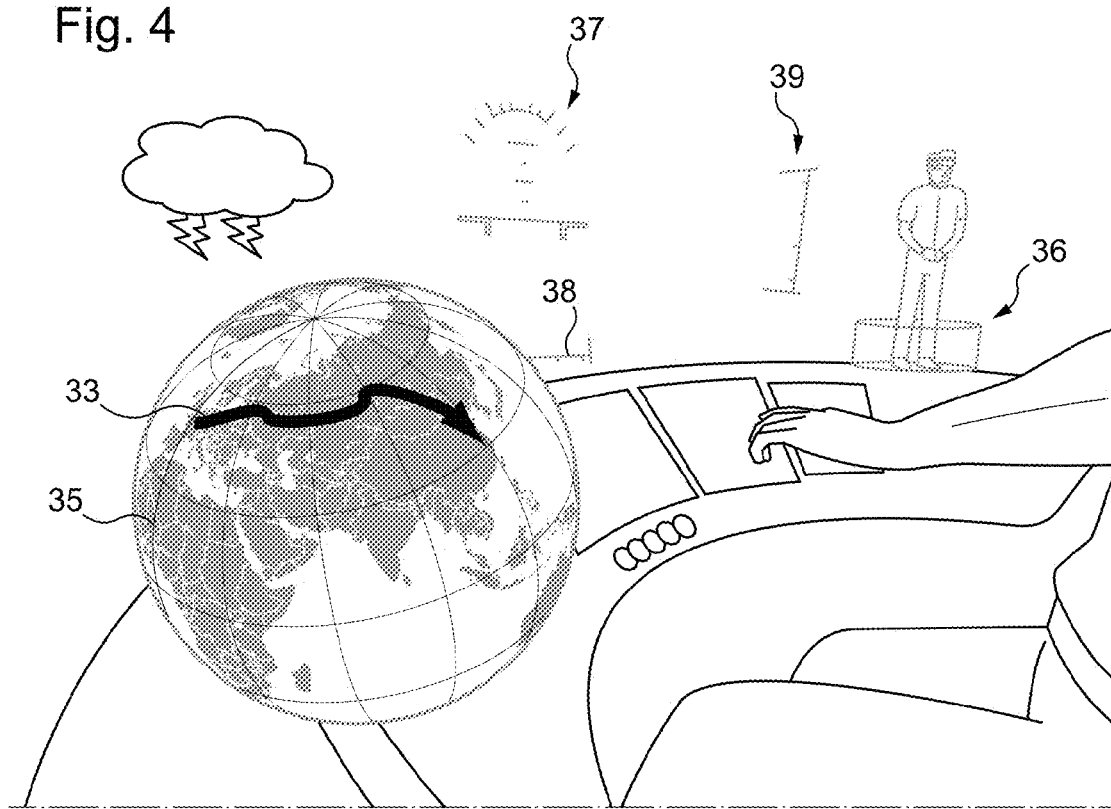
Figure 5:
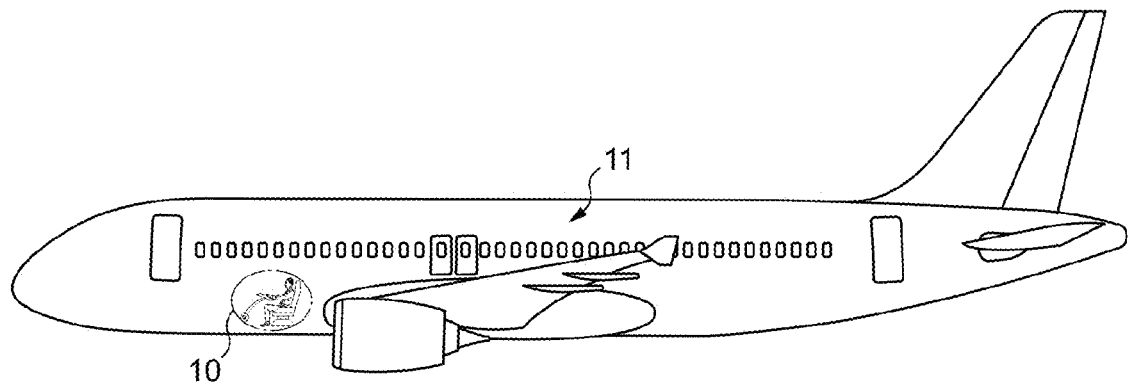
FIG. 5 is a side view of a first embodiment of an aircraft according to the invention of which part of the structure is transparent so as to see the cockpit, delocalized in a hold.
Figure 8:
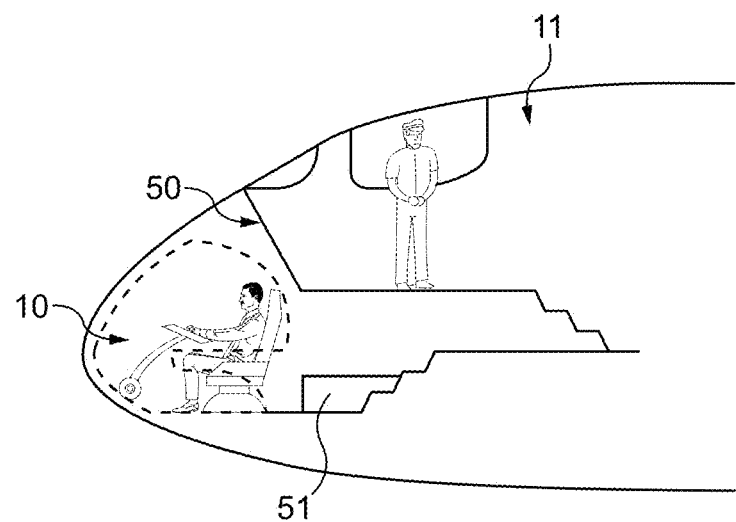
FIG. 8 is a cross-section view in a longitudinal vertical plane of the nose of the fourth embodiment of an aircraft according to the invention.

Furthermore, to that digital image of the outside scene there may be added one or more of the following items (the display means then being adapted to display—and possibly also to generate—the said item or items:
one or more images superposed relative to the digital image of the outside scene on the viewing surface 1 for piloting, for example such as:
   an arrow 32 representing the path the aircraft should follow, as recommended by a pilot on the ground given various obstacles (other vehicles on the ground, clouds, etc.) present on the current path of the aircraft; this example is illustrated in FIG. 3,
   the drawing of the outline or placing in relief or in color of an obstacle in the video image as illustrated in the case of a storm cloud 31 (here, drawings of lightning bolts are also added) in FIG. 3, in order to draw the pilot's attention to that obstacle,
   a graphical representation 37 to 39 (cf. FIG. 3) of one or more flight instruments, such as an artificial horizon, an anemometer, an altimeter, a directional gyroscope or horizontal situation indicator, etc. (see for example FIG. 3),
an image formed holographically outside of (for example in front of) the viewing surface 1 for piloting, for example such as:
   a hologram 34 representing a 3D mesh of the earth's surface extending under and forward of the aircraft as illustrated in FIG. 2, it being possible for part of the hologram to be superposed relative to the digital image of the outside scene on the viewing surface for piloting 1, another part being able to invade the cockpit space;
   a hologram 35 (FIG. 4) representing a terrestrial globe with a modified flight plan 33 which the aircraft should follow until the end of the mission, as recommended by an assistant pilot on the ground having the task of managing the flight mission (the pilot in the aircraft then only having the task of flying the aircraft, which considerably reduces his workload) given the various obstacles present on the current flight plan of the aircraft,
   a hologram 36 representing for example an assistant pilot on the ground, by way of warning signal in case of some kind of danger.
   a holographic representation 37 to 39 (cf. FIG. 4) of one or more flight instruments, such as an artificial horizon, an anemometer, an altimeter, a directional gyroscope or horizontal situation indicator, etc. (see for example FIG. 3), The cockpit 10 illustrated in FIGS. 1 to 4, may be housed below a passenger cabin 11 as may be observed in FIG. 5, the passenger cabin 11 then advantageously extending within the nose right to the front end of the aircraft. It is to be noted that in this case, the cockpit 10 may be housed at any location of the hold in a central part of the fuselage (FIG. 5) or in the nose (FIG. 8), the latter situation not preventing provision of a lancet-shaped nose since the cockpit may lack any glazed surface. It is possible to provide a window 50 (FIG. 8) or a glazed floor between the cabin and the cockpit in order to enable the passengers to observe the pilot or pilots carrying out their functions, with their agreement. A resting space with berths 51 may be configured under the floor of the cabin to the rear of the pilot seat or seats, concealed from view.

Figure 6:
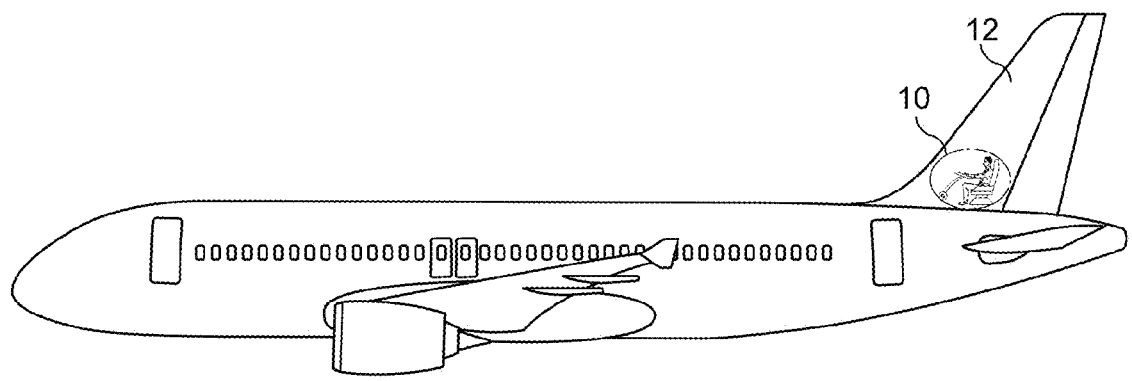
FIG. 6 is a side view of a second embodiment of an aircraft according to the invention of which part of the structure is transparent so as to see the cockpit, delocalized in the fin.

As a variant, the cockpit 10 according to the invention may be housed in a lower part of a fin 12 of the aircraft, as FIG. 6 shows. In this variant, it is possible to provide a glazed surface to form part of the viewing surface for piloting since the structure of the fin at that location bears no load. Furthermore, the integration of the cockpit in a lower part of the fin enables an additional configurable volume to be recovered, which was hitherto unused. The zone located under the cockpit in prior aircraft is a zone that is conventionally not commercially exploited. By shifting the rear fluid-tight partition of the cabin to the location of the APU compartment where the auxiliary generator system is installed and by positioning the horizontal tail higher than is customary, it is possible to retrieve a large volume, which is of no value for the cabin, but which is advantageous for the aircraft crew. As a matter of fact, this volume may be configured as a living area (with a room for resting) for the crew, this living area communicating directly with the cockpit and which could communicate with the cabin by an armored door, the access to which is reserved, to deter any act of infraction and terrorism. The comfort and safety of the crew are thereby improved. The creation of this area rendered safe for all the crew is made without taking volume away from the cabin and thus without reducing the number of passengers able to be received or their comfort.

Thus, the APU compartment (not shown) of the aircraft illustrated in FIG. 6 is advantageously closed by a fluid-tight forward partition, extending to the rear of the fin or below a rear portion of the fin, and separating said APU compartment from a pressurized area configured to receive members of the crew. This area is preferably separated from the passenger cabin 11 by an armored door (not shown).

Figure 7:
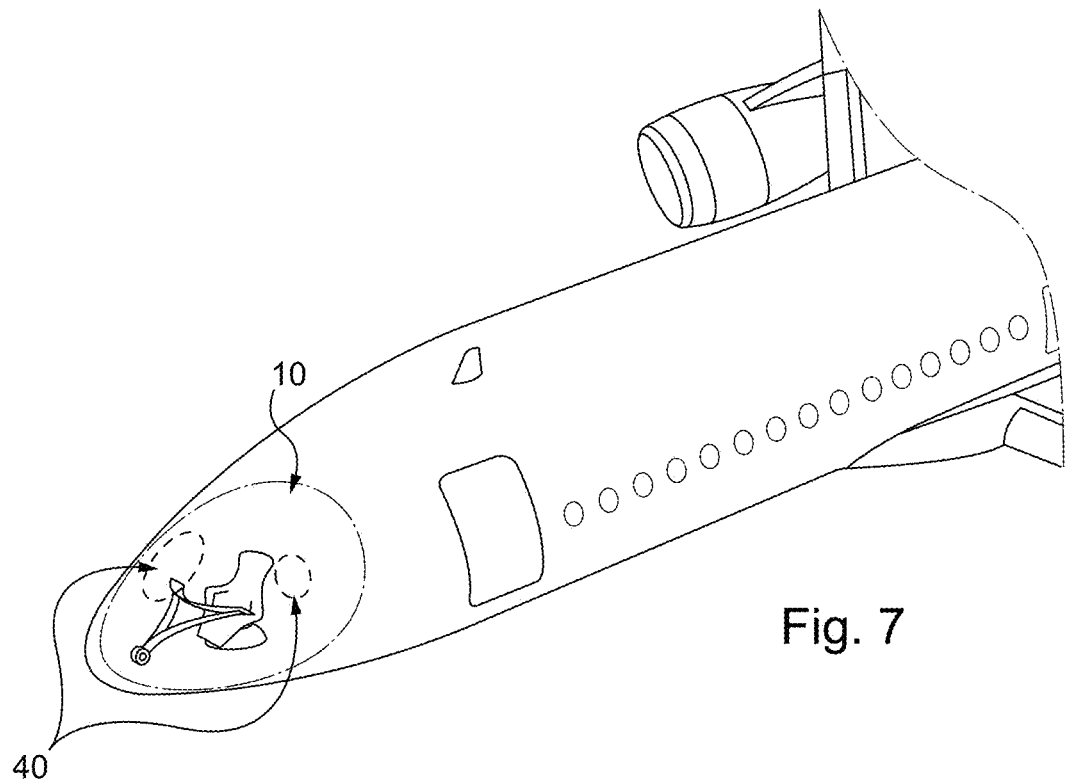
FIG. 7 is a perspective view of a third embodiment of an aircraft according to the invention of which part of the structure is transparent so as to see the cockpit, situated in the nose.

The cockpit 10 may also be housed in the nose of the aircraft, including in a lancet-shaped nose, at the conventional location of a cockpit. FIG. 7 illustrates this variant, with a viewing surface for piloting that comprises, in addition to the display means according to the invention, glazed surfaces 40 of small size. The virtual part of the viewing surface for piloting may be interrupted at the location of those glazed surfaces, or be superposed relative thereto, provided a transparent screen or holographic display means are provided.

The invention may be the object of numerous variants relative to the embodiments described and illustrated, provided those variants remain within the scope delimited by the appended claims.

The invention claimed is:

1. An aircraft including a cockpit wherein the cockpit comprises:
    a seat for a pilot;
    a viewing surface for piloting entirely formed by a digital display device, wherein the viewing surface for piloting extends at least partially around a front and opposite sides of the seat;
    wherein:
        said viewing surface for piloting is configured to present a digital image representing at least a view of an outside scene of the environment exterior to the aircraft, the outside scene presented on the viewing surface is configured to display a selectable view from at least (1) a first area forward of a nose of the aircraft, (2) a second area visible from a fin of the aircraft, and (3) a third area visible from a point situated to the rear of the aircraft and at a different altitude, as well as a combination thereof; and
        the viewing surface for piloting lacks glazed surfaces.

2. An aircraft according to claim 1 further comprising a fin, the cockpit being within the fin.

3. The aircraft according to claim 2, wherein the cockpit is in a lower part of the fin of the aircraft but above a main body of the aircraft.

4. The aircraft according to claim 1, further comprising a selector configured to select views of the outside scene to present on the digital display.

5. The aircraft according to claim 1, wherein the digital image representing at least a view of the outside scene is a three dimensional image or an image with augmented reality.

6. The aircraft according to claim 1, wherein the digital display device is configured to display not only the digital image representing at least a view of the outside scene but also an additional digital image superimposed on the digital imaging representing at least a view of the outside scene and/or an additional image formed holographically outside the viewing surface for piloting.

7. The aircraft according to claim 6, wherein the additional image represents at least one of: a flight path, an obstacle, a flight instrument, a 3D mesh of earth's surface extending under and forward of the aircraft, and an assistant pilot on the ground.

8. The aircraft according to claim 1, wherein the digital display device includes a semispherical display screen.

9. The aircraft according to claim 8, wherein the viewing surface for piloting is a surface of an Organic Light-Emitting Diode (OLED) screen.

10. The aircraft according to claim 1, wherein the viewing surface for piloting forms a semispherical surface centered on the seat for the pilot.

11. The aircraft according to claim 10, wherein the viewing surface for piloting is a substantially hemispherical shape, having a radius between 3 and 4 meters.

12. The aircraft according to claim 1, wherein the cockpit is below and rearward of a forwardmost portion of a passenger cabin of the aircraft.

13. The aircraft according to claim 12, wherein the passenger cabin extends to a front end of the aircraft.

14. An aircraft comprising:
    a fuselage including a cabin extending to the front of the fuselage;
    a cockpit in the fuselage, separate from cabin and rearward of the front of the fuselage, wherein the cockpit includes:
        a seat for a pilot;
        at least one digital display screen arranged to form a semispherical viewing surface for piloting, wherein the viewing surface for piloting is positioned forward of the seat and extends at least partially around the seat; and
        an instrument panel between the viewing surface for piloting and the seat,
        wherein the viewing surface for piloting presents a current view of an outside scene looking forward of the aircraft, and the viewing surface for piloting lacks glazed surfaces, the current view being selected by a pilot from options including at least (1) a first area forward of a nose of the aircraft, (2) a second area visible from a fin of the aircraft, and (3) a third area visible from a point situated to the rear of the aircraft and at a different altitude, as well as a combination thereof.

* * * * *